Patented Apr. 13, 1954

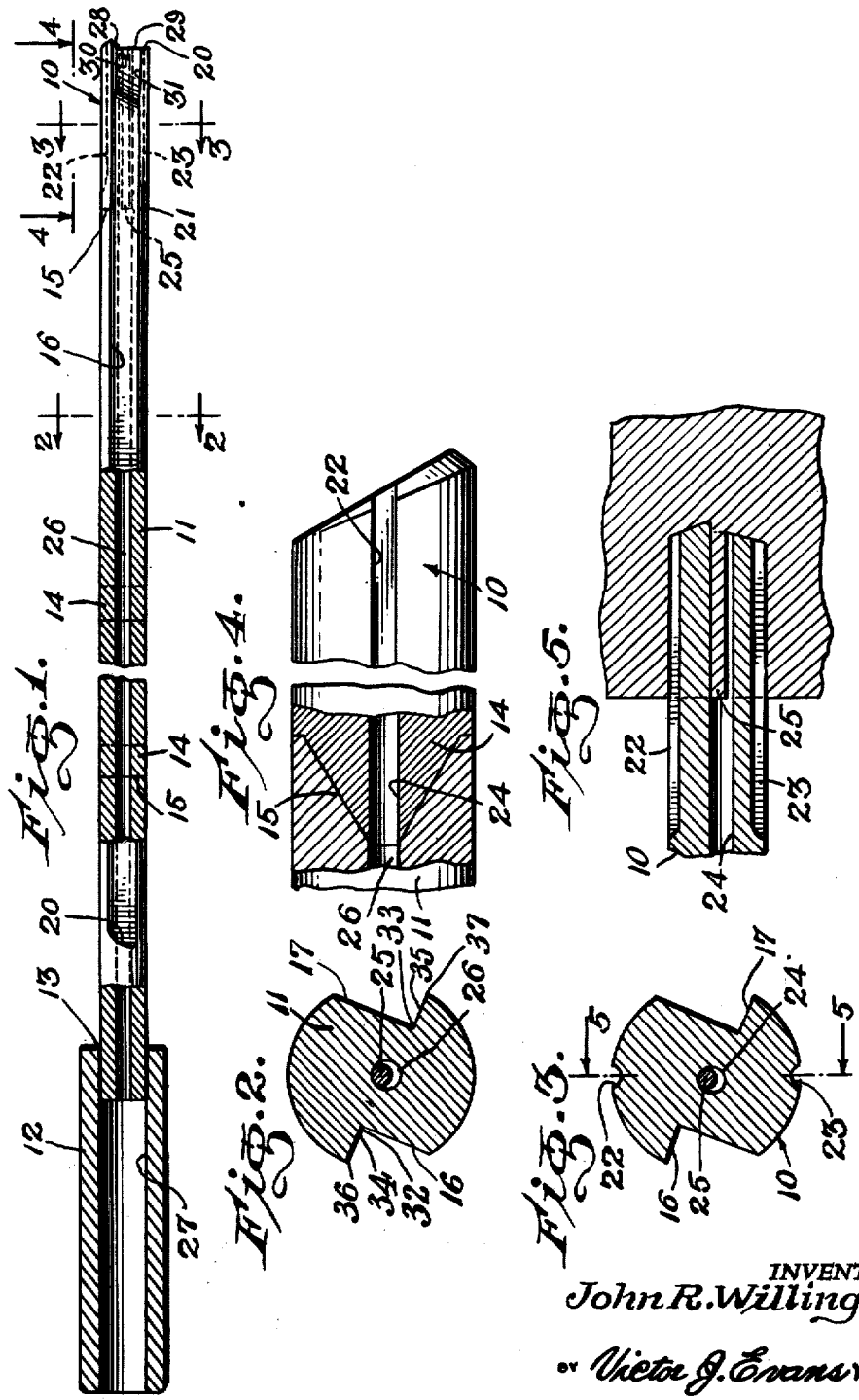

2,674,908

UNITED STATES PATENT OFFICE 2,674,908

GUN DRILLING TOOL

John R. Willingham, Detroit, Mich.

Application May 25, 1953, Serial No. 357,248

1 Claim. (Cl. 77—68)

This invention relates to a deep hole drill of the type having a substantially solid cylindrical tip of carbide or the like carried by an elongated shank, such as is used for drilling gun barrels and the like, and in particular a drill having an eccentrically positioned lubricating and pin receiving opening extended longitudinally therethrough with chip carrying channels having continuous chip removing edges on the following sides in the peripheral surface and with the parts formed to provide a balanced tip or drill head.

The purpose of this invention is to provide an improved tool for drilling gun barrels and the like with which gun barrels may be drilled, and finished in a single operation and at comparatively high speed.

With the conventional type of drill used for drilling gun barrels and the like it is necessary to drill the hole and then take roughing and finishing cuts, and with some drills now in use the lubricant supplying opening and chip returning channels not only weaken the structure of the drill, but cause the drill to be off-balance which necessarily limits the travel and the speed, and often results in an uneven or off center hole.

Furthermore with conventional drills used for this purpose the load is taken at the point or center of the head which increases feed loads and stresses throughout the drill head and shank and limits the speed with which holes may be drilled.

With these thoughts in mind this invention contemplates an improved drill in which the cross sectional structure is maintained throughout the substantially solid carbide drill tip and also throughout the drill shank, wherein chip carrying channels are equally spaced in the periphery of the drill, and wherein a lubricating channel through the center of the drill is offset, or extended laterally to provide a fluid carrying area along a pin or core extending through the center of the drill, and formed during cutting.

One object of this invention is, therefore, to provide an improved drill, for drilling gun barrels and the like in which the cross sectional structure is the same on both sides of the center so that a balanced action is set up in the drill as it operates, making it possible to drill a hole on a substantially true center, and also making it possible to operate the drill at comparatively high speed.

The life of conventional drills of this type is comparatively short because the hard cutting material at the tip of the bit is in the form of an insert and this is soon ground away as the drill is sharpened. For this reason it is another object of this invention to extend the life of drills of this type and with this thought in mind a hard cutting material, such as carbide, Carboloy or Kennametal is extended throughout the length of the drill tip and the diameter of the drill head is maintained thoughout a portion thereof whereby the same diameter is maintained even though the outer end of the drill is ground away.

A further object of the invention is to provide means for forming a drill head whereby the drill may be rotated and fed at a comparatively high speed.

A still further object of the invention is to provide an improved drill for drilling gun barrels and the like in which the drill is of a comparatively simple and economical construction.

With these and other objects and advantages in view the invention embodies a drill having a substantially cylindrical tip mounted on the end of a cylindrical shank with equally spaced knife sharp edged chip carrying channels extending longitudinally throughout the peripheral surfaces of the tip and shank and having a pin receiving and lubricating fluid carrying opening extended through the shank and tip and offset from the center of the drill.

Other features and advantages of the invention will appear from the following description taken in connection with the drawing, wherein:

Figure 1 is a side elevational view of the improved drill with parts broken away and also with parts shown in section.

Figure 2 is a cross section through the shank of drill taken on line 2—2 of Figure 1 with the drill shown on an enlarged scale.

Figure 3 is a cross section through the tip of the drill taken on line 3—3 of Figure 1 with the parts also shown on an enlarged scale illustrating a modification wherein oil grooves are provided in the peripheral surface between the chip carrying channels.

Figure 4 is a plan view taken on line 4—4 of Figure 1 showing the tip of the drill, also with parts broken away and with parts shown in section, the parts being shown on an enlarged scale.

Figure 5 is a longitudinal section through the cutting end or tip illustrating the drill in operation, with the drill cutting into a solid block of material and with a pin, cut from the block of material extended into the offset opening in the center of the drill.

Referring now to the drawing wherein like reference characters denote corresponding parts the improved gun drill or finishing tool of this invention includes a substantially cylindrical tip 10, an elongated shank 11 formed of sections, and an adapter 12 which may be formed with a conventional outer surface depending upon the machine in which the drill is used, the outer surface being cylindrical, tapering, or formed to provide suitable gripping surfaces.

As illustrated in Figure 1 the inner end of the shank 11 is secured in the adapter with a press fit or by welding, as shown at the point 13, or by other suitable means.

Although it is understood that the drill tip may be formed of hard material such as carbide of the Carboloy or Kennametal varieties, the tip may be formed of other suitable material and the shank on the end of which the tip is carried may be formed in sections, as shown in the drawing, or by other suitable means.

In the design shown the ends of the sections of the shank are dove tailed having V-shape tongues 14 fitted into correspondingly shaped transversely disposed slots 15 and the tip is provided with a similar tongue by which the tip is secured in a slot 15 at the end of the shank.

The peripheral surfaces of the tip and shank are shown with flutes or grooves 16 and 17 which may be shaped as illustrated in Figure 2 in which continuous channels 18 and 19 extend from the tip of the drill bit to points 20 spaced from the base or adapter.

The outer surface of the tip which, as illustrated in Figure 1, extends from a point 20, substantially at the leading end of the tip, to a point 21, at the end of one of the dove tail connections, is cylindrical from the point 20 to a point substantially one-third of the length of the tip and from the end of the cylindrical section the tip tapers to the connection with the shank at the point 21, the diameter of the shank being slightly less than that of the tip. The outer surface of the tip may also be provided with oil grooves, as indicated by the numerals 22 and 23 which extend from the cutting end or tip to points spaced from the point 21.

The head is also provided with a longitudinally disposed oil carrying and pin receiving opening 24 which, as illustrated in Figure 3 is off center, relieving the pressure at the tip of the drill and providing a passage for a centrally positioned pin 25 and also for lubricant supplied to the tip of the drill through a passage 26 in the shank. The pasage 26 extends from the inner end of the tip to the adapter, being in communication with an oil reservoir or opening through the adapter, as indicated by the numeral 27. The opening 26 through the shank of the drill is preferably slightly larger than the opening 24 through the tip whereby the pressure of the oil which may be as much as three hundred pounds through the tip is increased so that the oil will work across the cutting edges at the tip and back through the grooves 16 and 17.

As illustrated in Figure 1 the cutting tip or point at the end of the drill, which is indicated by the numeral 28 is positioned between the center of the tip and the peripheral surface and the distance between the point and peripheral surface is less than that between the point and center of the drill. With the point located in an off center position the angle of the cutting edge between the point and peripheral surface is less than that from the point across the face or cutting end of the drill, and the end of the drill, with the parts positioned as shown in Figure 1, is described by straight line 29 that is perpendicular to the axis of the drill head. The end of the drill head is provided with a slot 30 through which communication is established between the opening 24 and oil carrying grooves 22 and 23. One side of the flute or groove positioned in one side of the tip is flared outwardly as shown at the point 31 providing means for guiding chips and the like into the flutes or channels 16 and 17.

The end or tip of the drill head may be formed with a continuous angularly disposed edge, as shown in Figures 4 and 5, or the end of the drill may be formed with a plurality of cutting edges.

With the parts formed as shown the material forming the tip and shank is distributed equally on both sides of the center whereby a balanced drill is provided and with the entire head formed of a hard material and of the same diameter for a considerable distance from the cutting point the drill may be sharpened continuously without reducing the cutting bore or diameter and without running out of inserts of hard material at the cutting tip.

With the cross sectional structure as illustrated in the drawing, maintained both throughout the drill tip and shank the torsional strains and stresses are reduced to a minimum and a strong drill is provided.

Furthermore with both the drill tip and shank balanced the drill can be rotated at higher speeds and can also be fed through the material at a comparatively rapid speed.

A drill formed in this manner is adapted to be used by rotating the drill, instead of holding the drill stationary and rotating the work, and in starting the drill into a gun barrel or other mass of material the head is retained in position with a conventional drill guide bushing.

In rotating the drill the drill is also adapted for drilling holes in castings or other work.

This improved drill is not only comparatively strong and adapted for high speed drilling, but the life thereof is indefinite as it may be ground until the entire tip is used.

With the opening 26 eccentrically positioned in the tip of the drill, as illustrated in Fig. 2, the distance from the periphery of the opening to the root of the chip channel 16, as indicated by the numeral 32, is greater than the distance from the root 33 of the channel 17 to the periphery of the opening 26 on the opposite side of the tip. The cutting edge at the end of the tip is, therefore, of greater length on one side of the drill than on the other, thereby compensating for the offset position of the opening 26. By this means the width of the surface 34 is greater than that of the surface 35. The corners 36 and 37 at the outer edges of the surfaces 34 and 35 are knife sharp, whereby, upon rotation of the drill in a counter-clockwise direction from the position shown in Fig. 2 the edges scrape or peel chips in the channels 16 and 17 from the wall of the opening thereby removing any possibility of the chips scoring the wall of the opening formed by the drill.

Upon rotation of the drill, one cutting edge being longer than the other cutting edge, the cutting action is confined to one side, only, of the drill, whereby the pin is cut at one point and the remainder of the pin surface is in the clear. By this means the pin is much smaller than the longitudinally disposed opening through the drill. With the drill tip formed in this design, a swedging or burnishing action is obtained, as the peripheral taper, in the design of the substantially solid carbide tip, in combination with the length of the taper, which is governed and variably controlled performs a larger percentage of the work load than conventional drills, whereby super finishes, heretofore considered impossible are produced.

It will be understood that modifications, within the scope of the appended claim, may be made in the design and arrangements of the parts without departing from the spirit of the invention.

One of such modifications may be in the number of flutes or grooves, as, although only two are shown in the drawing, three or any number that makes a balanced head possible, may be used.

What is claimed is:

A deep hole drill comprising a drill tip carried on the end of a shank with straight equally spaced longitudinally positioned flutes providing chip carrying channels in the peripheral surfaces of the tip and shank, with the flutes in the tank aligned with the flutes in the drill tip, and with the flutes separated by lands having radially positioned leading sides, the trailing edges of the lands being connected by inclined surfaces to inner edges of the leading sides of following lands, and the intersection of said leading sides of the lands with the peripheral surfaces of the head and shank providing scraping edges for maintaining clear and unobstructed chip carrying channels throughout the length of the drill, the leading end of said drill having an eccentrically positioned point with coplaner cutting edges extended angularly therefrom and with said cutting edges positioned between the flutes, said drill having a longitudinally disposed bore extended continuously through the tip and shank and said bore being eccentrically positioned whereby the wall of the drill tip around the bore intercepts one of said cutting edges a greater distance from the center on one side of the drill than on the opposite side whereby the portion of the cutting edge extending from the point towards the center terminates at a point spaced from the longitudinal axis of the drill tip, so that in use material is cut around a centrally positioned pin and said pin is located in one side of the eccentrically positioned bore providing an open fluid carrying channel through the drill.

References Cited in the file of this patent

UNITED STATES PATENTS

| Number | Name | Date |
| --- | --- | --- |
| 2,412,939 | Aston | Dec. 24, 1946 |
| 2,610,529 | Atkinson | Sept. 16, 1952 |